United States Patent
Yoshino et al.

(10) Patent No.: US 7,771,280 B2
(45) Date of Patent: Aug. 10, 2010

(54) GAME CONSOLE CONNECTOR AND EMULATOR FOR THE GAME CONSOLE

(75) Inventors: Hiroshi Yoshino, Kyoto (JP); Keizo Ohta, Kyoto (JP); Yoshitaka Yasumoto, Kyoto (JP); Kenji Nishida, Kyoto (JP); Kenichi Sugino, Kyoto (JP); Masato Ibuki, Kyoto (JP); Ryuji Umezu, Kyoto (JP); Yutaka Iijima, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 966 days.

(21) Appl. No.: 11/127,319

(22) Filed: May 12, 2005

(65) Prior Publication Data

US 2006/0111190 A1    May 25, 2006

Related U.S. Application Data

(63) Continuation-in-part of application No. 11/111,985, filed on Apr. 22, 2005, which is a continuation-in-part of application No. 10/921,957, filed on Aug. 20, 2004.

(30) Foreign Application Priority Data

Mar. 31, 2004  (JP)  .............................. 2004-106874

(51) Int. Cl.
  *A63F 13/00*  (2006.01)
  *A63F 9/24*  (2006.01)
  *G06F 17/00*  (2006.01)
  *G06F 19/00*  (2006.01)

(52) U.S. Cl. .............................. 463/43; 463/44; 463/45

(58) Field of Classification Search ...................... 463/1, 463/43–47; 711/1; 257/690; 439/60
See application file for complete search history.

(56) References Cited

U.S. PATENT DOCUMENTS

| 4,204,728 | A |   | 5/1980  | Goshima et al. |
| 4,384,326 | A | * | 5/1983  | Devchoudhury ............. 711/163 |
| 4,432,067 | A | * | 2/1984  | Nielsen ....................... 463/44 |
| 4,481,529 | A |   | 11/1984 | Kerling |
| 4,516,777 | A |   | 5/1985  | Nikora |
| 4,542,903 | A |   | 9/1985  | Yokoi et al. |
| 4,628,304 | A |   | 12/1986 | Bottiau |

(Continued)

FOREIGN PATENT DOCUMENTS

EP    0 850 672    1/1998

(Continued)

OTHER PUBLICATIONS

Computer Closet Collection, NEC Turbo Express, printed from wysiwyg://22/http://www.geocities.com/.about.compcloset/NECTurboExpress.htm on Sep. 28, 2000 (2 pages), copyright 1997-1999, last modified Jun. 24, 1999.

(Continued)

*Primary Examiner*—Dmitry Suhol
*Assistant Examiner*—Binh-An D Nguyen
(74) *Attorney, Agent, or Firm*—Nixon & Vanderhye PC

(57) ABSTRACT

A portable game system includes two display screens, at least one of which is touch-sensitive. A memory card or other device is selectively connectable to the portable game system via in insertable connection port.

6 Claims, 13 Drawing Sheets

U.S. PATENT DOCUMENTS

| | | | |
|---|---|---|---|
| 4,703,318 A | 10/1987 | Haggerty | |
| 4,811,205 A | 3/1989 | Normington et al. | |
| 4,865,321 A | 9/1989 | Nakagawa et al. | |
| 4,922,420 A | 5/1990 | Nakagawa et al. | |
| 4,924,413 A | 5/1990 | Suwannukul | |
| 4,931,860 A | 6/1990 | Narumiya | |
| 4,977,398 A | 12/1990 | Pleva et al. | |
| 4,979,738 A | 12/1990 | Frederiksen | |
| 4,981,296 A | 1/1991 | Shiraishi et al. | |
| 4,984,193 A | 1/1991 | Nakagawa | |
| 5,023,603 A | 6/1991 | Wakimoto et al. | |
| 5,095,798 A | 3/1992 | Okada et al. | |
| 5,109,504 A | 4/1992 | Littleton | |
| 5,112,051 A * | 5/1992 | Darling et al. | 463/45 |
| 5,134,391 A | 7/1992 | Okada | |
| 5,155,380 A | 10/1992 | Hwang et al. | |
| 5,161,803 A | 11/1992 | Ohara | |
| 5,184,830 A | 2/1993 | Okada et al. | |
| 5,207,426 A | 5/1993 | Inoue et al. | |
| 5,238,250 A | 8/1993 | Leung et al. | |
| 5,245,327 A | 9/1993 | Pleva et al. | |
| 5,265,888 A | 11/1993 | Yamamoto et al. | |
| 5,300,944 A | 4/1994 | Shapiro et al. | |
| 5,321,811 A | 6/1994 | Kato et al. | |
| 5,327,158 A | 7/1994 | Takahashi et al. | |
| 5,371,512 A | 12/1994 | Otake et al. | |
| 5,395,112 A * | 3/1995 | Darling | 463/44 |
| 5,400,053 A | 3/1995 | Johary et al. | |
| 5,412,800 A | 5/1995 | Bril et al. | |
| 5,422,375 A | 6/1995 | Rytter et al. | |
| 5,453,763 A | 9/1995 | Nakagawa et al. | |
| 5,495,266 A | 2/1996 | Otake et al. | |
| 5,509,663 A | 4/1996 | Otake et al. | |
| 5,552,799 A | 9/1996 | Hashiguchi | |
| 5,556,108 A | 9/1996 | Nagano et al. | |
| 5,559,954 A | 9/1996 | Sakoda et al. | |
| 5,592,651 A | 1/1997 | Rackman | |
| 5,603,064 A | 2/1997 | Bennett | |
| 5,608,424 A | 3/1997 | Takahashi et al. | |
| 5,617,546 A | 4/1997 | Shih et al. | |
| RE35,520 E | 5/1997 | Darling et al. | |
| 5,659,673 A | 8/1997 | Nonoshita | |
| 5,708,457 A | 1/1998 | Otake et al. | |
| 5,714,981 A | 2/1998 | Scott-Jackson et al. | |
| 5,759,104 A | 6/1998 | Shirae et al. | |
| 5,768,608 A | 6/1998 | Nakamura | |
| 5,770,533 A | 6/1998 | Franchi | |
| 5,785,598 A | 7/1998 | Hsu | |
| 5,790,096 A | 8/1998 | Hill, Jr. | |
| 5,793,351 A | 8/1998 | Leach | |
| 5,808,591 A | 9/1998 | Mantani | |
| 5,844,532 A | 12/1998 | Silverbrook et al. | |
| 5,854,620 A | 12/1998 | Mills et al. | |
| 5,892,939 A | 4/1999 | Call et al. | |
| 5,949,985 A | 9/1999 | Dahl et al. | |
| 5,954,808 A | 9/1999 | Paul | |
| 5,959,596 A | 9/1999 | McCarten et al. | |
| 6,020,751 A | 2/2000 | Rampone et al. | |
| 6,042,478 A * | 3/2000 | Ng | 463/44 |
| 6,047,373 A | 4/2000 | Hall et al. | |
| 6,052,794 A | 4/2000 | Polzin et al. | |
| 6,109,939 A | 8/2000 | Kondo et al. | |
| 6,115,054 A | 9/2000 | Giles | |
| 6,132,315 A | 10/2000 | Miyamoto et al. | |
| 6,170,743 B1 | 1/2001 | Okaue et al. | |
| 6,199,756 B1 | 3/2001 | Kondo et al. | |
| 6,200,216 B1 | 3/2001 | Peppel | |
| 6,209,043 B1 | 3/2001 | Sanemitsu | |
| 6,215,459 B1 | 4/2001 | Reddy et al. | |
| 6,243,654 B1 * | 6/2001 | Johnson et al. | 702/85 |
| 6,295,206 B1 | 9/2001 | Kondo et al. | |
| 6,311,246 B1 | 10/2001 | Wegner et al. | |
| 6,315,669 B1 | 11/2001 | Okada et al. | |
| 6,322,447 B1 | 11/2001 | Okada et al. | |
| 6,334,815 B2 | 1/2002 | Miyamoto et al. | |
| 6,341,728 B1 | 1/2002 | Kondo et al. | |
| 6,361,369 B1 | 3/2002 | Kondo et al. | |
| 6,424,348 B2 | 7/2002 | Parikh et al. | |
| 6,466,218 B2 | 10/2002 | Parikh et al. | |
| 6,480,929 B1 | 11/2002 | Gauthier et al. | |
| 6,522,309 B1 | 2/2003 | Weber | |
| 6,609,977 B1 | 8/2003 | Shimizu et al. | |
| 6,616,053 B2 | 9/2003 | Kondo et al. | |
| 6,669,487 B1 * | 12/2003 | Nishizawa et al. | 439/60 |
| 6,672,963 B1 | 1/2004 | Link | |
| 6,716,103 B1 | 4/2004 | Eck et al. | |
| 6,729,548 B2 | 5/2004 | Kondo et al. | |
| 6,743,104 B1 * | 6/2004 | Ota et al. | 463/44 |
| 6,783,076 B2 | 8/2004 | Kondo et al. | |
| 6,786,417 B1 | 9/2004 | Kondo et al. | |
| 6,810,463 B2 | 10/2004 | Okada et al. | |
| 6,821,204 B2 | 11/2004 | Aonuma et al. | |
| 7,066,394 B2 | 6/2006 | Kondo et al. | |
| 7,134,960 B1 | 11/2006 | Shimizu et al. | |
| 7,338,376 B2 | 3/2008 | Eck et al. | |
| 7,445,551 B1 | 11/2008 | Okada et al. | |
| 2001/0047452 A1 | 11/2001 | Okada | |
| 2002/0050999 A1 | 5/2002 | San et al. | |
| 2002/0151360 A1 | 10/2002 | Durham | |
| 2004/0157664 A1 | 8/2004 | Link | |
| 2005/0227761 A1 | 10/2005 | Yoshino et al. | |
| 2005/0245313 A1 | 11/2005 | Yoshino et al. | |
| 2006/0094512 A1 | 5/2006 | Yoshino et al. | |
| 2006/0100021 A1 | 5/2006 | Yoshino et al. | |
| 2006/0111190 A1 | 5/2006 | Yoshino et al. | |
| 2007/0197291 A1 | 8/2007 | Shimizu et al. | |

FOREIGN PATENT DOCUMENTS

| | | |
|---|---|---|
| JP | 58-116377 | 7/1983 |
| JP | 63-242293 | 10/1988 |
| JP | 4-49989 | 2/1992 |
| JP | 4-140791 | 5/1992 |
| JP | 4-140792 | 5/1992 |
| JP | 5-204820 | 8/1993 |
| JP | 6-42263 | 6/1994 |
| JP | 7-204349 | 8/1995 |
| JP | 7281806 | 10/1995 |
| JP | 08-180149 | 7/1996 |
| JP | 10-137447 | 5/1998 |
| JP | 10-222621 | 8/1998 |
| JP | 10-328408 | 12/1998 |
| JP | 11-207034 | 8/1999 |
| JP | 0 960 637 | 12/1999 |
| JP | 11-333144 | 12/1999 |
| JP | 2001-067054 | 3/2001 |
| JP | 2001087555 | 4/2001 |
| JP | 2001-327757 | 11/2001 |
| JP | 2003-103051 | 4/2003 |
| JP | D1182081 | 6/2003 |
| WO | 00/79372 | 12/2000 |

OTHER PUBLICATIONS

NEC Turbo Express, printed from http://www.edu.uni-klu.ac.at/.about.kseiner/express.html on Sep. 28, 2000 (2 pages), document date unknown.

Turbo Express FAQ, printed from http://www.gameconsoles.com/turboexp_faq.htm on Sep. 28, 2000 (18 pages), last revision of document: May 25, 1995.

Computer Closet Collection, Sega Game Gear, printed from wysiwyg://28/http://www.geocities.com/.about.compcloset/SegaGameGear.htm on Sep. 28, 2000 (2 pages), copyright 1997-1999, last modified Jun. 22, 1999.

The Real Game Gear FAQ, Version GG.04, Dec.1999, printed from http://www.classicgaming.com/museum/realggfag.txt on Sep. 28, 2000 (32 pages).

Computer Closet Collection, Atari Lynx, printed from wysiwyg://12/http://www.geocities.coml.about.compcloset/AtariLynx.htm on Sep. 28, 2000 (2 pages), copyright 1997-1999, last modified Jun. 22, 1999.

[FAQ] Atari Lynx Frequently-Asked Questions, printed from http://www.landfield.com/faqs/games/videogames/atari/lynx on Sep. 28, 2000 (16 pages), last revision of document: May 1, 2000.

Computer Closet Collection, Nintendo Game Boy/Game Boy Light, printed from wysiwyg://40/http://www.geocities.com/.about.compcloset/NintendoGameBoy. htm on Sep. 28, 2000 (5 pages), copyright 1997-1999, last modified Jun. 22, 1999.

Computer Closet Collection, Milton-Bradley Microvision, printed from wysiwyg://52/http://www.geocities.com/.about.compcloset/MiltonBradley-Microvision.htm on Sep. 28, 2000 (2 pages), copyright 1997-1999, last modified Jun. 22, 1999.

Microvision FAQ Version 0.08, copyright 1994, 1995, printed from http://wvvw.gameconsoles.com/microvision_faq.htm on Sep. 28, 2000 (13 pages).

Computer Closet Collection, Sega Nomad, printed from wysiwyg://34/http://www.geocities.com/.about.compcloset/SegaNomad.htm on Sep. 28, 2000 (2 pages), copyright 1997-1999, last modified Jun. 22, 1999.

Sega Nomad Press Announcement of Aug. 22, 1995, printed from http://gamezero.com/teamOwhats_new/past/nomad.html on Sep. 28, 2000 (2 pages).

Computer Closet Collection, Tiger Game.com, printed from wysiwyg://46/http://www.geocities.com/.about.compcloset/TigerGameCom.htm on Sep. 28, 2000 (1 page), copyright 1997-1999, last modified Jun. 22, 1999.

Tiger Game.Com, "Low Cost, Big Games", printed from http://gamecenter.com/Consoles/Features/Pocket/ss02.html on Sep. 28, 2000 (2 pages), document date unknown.

British Toys & Hobbies, "Milton Bradley—a very individual range," vol. 29, No. 1, Jan. 1980, (3 pages).

Playthings, American Toy Fair Special Highlights Edition, "Tomy augments toys with none additions for kids aged three and up," (3 pages).

Playthings, Directory Issue, Market Reference Information for Buyers & Manufacturers of Toys, Hobbies & Crafts (2 pages), May 31, 1980.

'83 New Brandai Fair, "Animest," (2 pages).

Playthings, 1983 American Toy Fair Special Highlights Edition, "Thumb Power puts imprint on its new handheld games," (3 pages), Feb. 1983.

Playthings, Unveiling the 1983 Toy Lines Electronic Circuit: Expanded Section, "Nintendo Goes Beyond Hand-Held Electronic Games," (3 pages).

Playthings, Special Highlights Edition, Extra: Licensing Scope; Visitor's Guide to New York, vol. 82, No. 2, Feb. 1984 (4 pages).

TH&C (Toys Hobbies & Crafts), Special Toy Fair Issue, "Electronic Toys in '79: Buyers Brace for More Shortages," (3 pages).

Microvision—encyclopedia article about Microvision printed from http://encyclopedia.thefreeddictionarv.com/Microvision, May 31, 2004.

Computer Closet Collection, Milton Bradley Microsivion, printed from http://www.computercloset.org/MiltonBradleyMicrovision.htm, (2 pages), May 31, 2004.

Digital Equipment Corporation printed from http://db.gamefaqs.com/portable/microvision/file/microvision.txt (11 pages), May 31, 2004.

Milton Bradley Microvision (U.S.) (1979, LCD, 9 Volt (1 or 2), Model# 4952) printed from http://users2.evl.net/_rik1138/MB/uVUS.htm.

*68HC705V8 Specification Rev. 2.1 (General Release)*, MCU System Design Group, Oak Hill, Texas, Aug. 12, 1994, pp. iii - xi, xiii, and 89-96.

*HCO8 —68HC08AS32, Advance Information Rev. 3.0*, Motorola, printed out Jul. 24, 2001, pp. 2-27, 234-242 and 275-308.

Website http://www.repairfaq.org/Repair/F_Pinouts.html entiltled "Pinouts for various connectors in Real Life(tm)",.p. 1 of 3, dated May 20, 1997, author not established.

Christy J., Website http://www.repairfaq.org/REPAIR/F_SNES.html entitled "Super Nintendo Entertainment System:pinouts & protocol", Mar. 26, 1996, 5 pages.

Website http://vba.ngemu.com/faq.shtml entitled VirtualBoy Advance, Frequently Asked Questions, printed Mar. 31, 2004, pp. 1-17.

Website http://vba.nuemu.com entitled "Latest News: Sunday, Feb. 8, 2004—VisualBoyAdvance version.1.71. released", printed Mar. 31, 2004, pp. 1-3.

SourceForge.net:Project Filelist, Project: VisualBoyAdvance: File List, printed Apr. 21, 2004, pp. 1 and 2.

Website http://vba.ngemu.com/links/shtml entitled "Links", printed Mar. 31, 2004, pp. 1 and 2.

Website http://vba.ngemu.com/downloads/shtml entitled "Downloads", printed Mar. 31, 2004, pp. 1-11.

Website http://vba.ngemu.com/screenshots.shtml entitled "Screenshots", printed Mar. 31, 2004, pp. 1-5.

Website http://www.mame.net/hotrod.html entitled "HotRod Joystick and legal roms", printed Apr. 21, 2004, pp. 1 and 2.

Website http://www.mame.net/kibo.html entitled "Kibo explains MAME", printed Apr. 21, 2004, pp. 1-11.

Website http://www.mame.net/edge.html entitled "MAME article, Feb. 1997", printed Apr. 21, 2004, pp. 1 and 2.

Website http://www.mame.net/features.html entitled "Features", printed Apr. 21, 2004, pp. 1 and 2.

Website http://www.mame.net/compilewin.html entitled "How to compile (Win32)", printed Apr. 21, 2004, pp. 1-3.

Website http://www.mame.net/readmedos.html entitled "msdos.txt", printed Apr. 21, 2004, pp. 1-6.

Website http://www.mame.net/readmewin.html entitled "windows.txt", printed Apr. 21, 2004, pp. 1-16.

Website http://www.mame.net/readme.html entitled "mame.txt", printed Apr. 21, 2004, pp. 1-4.

Multiple Arcade Machine Emulator, Frequently Asked Questions v0.77wip, printed Apr. 13, 2004, pp. 1-41.

Website http://www.mame.net/documents.html entitled "Documents", printed Apr. 21, 2004, 1 page.

Website http://www.mame.net entitled "Welcome to the MAME website", printed Apr. 13, 2004, pp. 1-2.

Website http://www.zophar.net/gba.html entitled "GameBoy Advance Emulators", printed Mar. 30, 2004, pp. 1-4.

Website http://www.zophar.net/gb.html entitled "GameBoy Emulators", printed Mar. 30, 2004, pp. 1-12.

"Copyright.txt, VisualBoyAdvance (c) Copyright 2001 by Forgotten (vb@muhq.com)", 1 page.

"Readme vba v0.4.txt, Welcome to VisualBoyAdvance version 0.4", pp. 1-3.

Website http://www.gambitstudios.com/whatsnew.asp entitled "News, Announcements and Reviews", printed Jul. 8, 2004,.

Website http://www.gambitstudios.com/Liberty.asp entitled "Liberty Game Boy Emulator", printed Jul. 8, 2004, pp. 1-4.

Website http://phoinix.sourceforge.net/ entitled Phoinix, the free Gameboy emulator for PalmOS, pp. 1-5.

Website http://palmboy.suburbia.com.au/news.htm entitled "News about PalmBoy", printed Jul. 8, 2004, pp. 1-7.

Website http://palmboy.suburbia.com.au/ entitled "PalmBoy v.3.3b", printed Jul. 8, 2004, pp. 1-11.

"readme.txt, Snes9x: the Portable Super Nintendo Entertainment System Emulator", v1.19 Jun. 5, 1999, pp. 1-13.

Website http://little-bat.de/prog/download/z80_68k/z80_68k.html entitled "z80-68k-v150, Z80 Engine written in 68020 pp. 1-7. assembler for inclusion in C/C++ projects", copyright 1994-1999, printed on Jan. 18, 2006, pp.1-7.

Website http://www.eff.org/patent/wanted/prior.php?p=nintendo entitled "Patent Busting Project", printed Jul. 26, 2006, 3.

Website http://098.pocketheaven.com/ entitled "GameBoy 98 Homepage", printed Jan. 23, 2008, pp. 1-4.

Website http://users.erols.com/tiltonj/tech/nescont.html entitled "Nintendo NES and SNES controllers", printed Nov. 1, 2004, pp. 1-3.

Website http://repairfaq.ece.drexel.edu/REPAIR/F_Pinouts3.html entitled "Pinouts for various connectors in Real Life(tm)", printed Oct. 25, 2004, pp. 1-10.

Website http://repairfaq.ece.drexel.edu/REPAIR/F_Pinouts2.html entitled "Pinouts for various connectors in Real Life(tm)", printed Oct. 25, 2004, pp. 1-13.

Website http://repairfaq.ece.drexeL.edu/REPAIR/F_Pinoutsl.html entitled "Pinouts for various connectors in Real Life(tm)", printed Oct. 25, 2004, pp. 1-15.

Website http://www.gamesx.com/controldata/psxcont/psxcont.htm McCubbin, Andrew J., "Sony Playstation Controller Information", Aug. 13, 1998, 9 pages.

Pending claims and office action dated Mar. 2, 2009 in U.S. Appl. No. 11/598,231.

PC World, Sony, Nintendo Unveil Game Handhelds, Tom Mainelli, PC World, May 11, 2004, printed from http://www.pcworld.com/resource/printable/article/0,aid,116101,00.asp on Sep. 16, 2004 (3 pages).

Vidgame.net: Tiger Game.com, printed from http://www.vidgame.net/Tiger/GC.html on Sep. 16, 2004 (4 pages), © 2001-2004.

Consumer Guide®, Tapwave Zodiac PDA/Gaming Device Review, Rating & Prices Personal Digital Assistants (PDAs), printed from http://products.consumerguide.com/cp/electronics/review/index.cfm/id/26877 on Sep. 16, 2004 (3 pages), © 2004.

The Tapwave Zodiac Now Available for Pre-Order at www.Tapwave.com; Tapwave, Inc., Officially Launches the Zodiac Entertainment Console at DEMOmobile, Buisness Wire, p5531, Sep. 17, 2003 (7 pages).

Tapwave Zodiac Portable Gaming System and PDA, View Online™, eye candy, Catch a New Wave, David A. Dodson, printed from http://www.viewonline.com/pages/articles/tapwavezodiac.htm on Sep. 16, 2004 (3 pages).

Game Power Australia, E3 2004: Nintendo DS Hands-On Impressions, posted May 12, 2004, printed from http://www.gamepower.com.au/?aid=1960 on Sep. 13, 2004 (2 pages).

PGNx Media: Articles: Hardware Review: Tapwave Zodiac 1, printed from http://wvvw.pgnx.net/articles.php?p.=full&id=5762 on Sep. 16, 2004 (5 pages).

Nintendo.ca:: Press Release, Nintendo DS Lets Players Touch the Future, Los Angeles, May 11, 2004, printed from http://www.nintendo.ca/cgi-bin/usersite/display_info.cgi?lang=en&pageNum=9&id=7644861 on Sep. 13, 2004 (3 pages).

PALGN 2004:: Nintendo DS Lowdown, printed from http://palgn.com.au/article.php?id=1179 on Sep. 13, 2004 (3 pages), last update May, 2004.

* cited by examiner

*Example External Device Interface*

GAME CONSOLE CONNECTOR AND EMULATOR FOR THE GAME CONSOLE

CROSS-REFERENCE TO RELATED APPLICATIONS

This application is a continuation-in-part of application Ser. No. 11/111,985, filed Apr. 22, 2005, which is a continuation-in-part of application Ser. No. 10/921,957, filed on Aug. 20, 2004. The contents of each of these applications are incorporated herein in their entirety.

COPYRIGHTS PRESERVED

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The techniques herein relate to an electronic game and communications device and to a console configuration for a portable, handheld electronic game with dual screens. Certain of the illustrative embodiments also relate to a portable game machine including two or more display units, on each of which a three-dimensional game image, generated by a three-dimensional image processing unit, is displayed. The techniques herein further relate to connections between such a console and additional devices including but not limited to memory devices; and to devices such as memory devices that are compatible with such a console.

BACKGROUND

Portable, handheld game devices are by now well known in the art. See, for example, U.S. Pat. Nos. 6,716,103; 6,743,104; 6,821,204.

BRIEF DESCRIPTION OF EXAMPLE EMBODIMENTS

In an example embodiment, a portable, handheld electronic game device is provided in a unique console configuration, outfitted and arranged for easy access to various functional features and related aspects of the game device.

Generally, the portable game device in the example embodiment is made up of a main body and a cover body that is pivotally attached to the main body for movement between open and closed positions. Twin, backlit, color liquid crystal displays (LCD's) are provided, one on each of the inner surfaces of both the main body and cover body such that, when the cover body is pivoted over the main body to the closed position, the display screens substantially overlie one another and are hidden from view (and thus protected). Each LCD is a three inch screen that can reproduce true 3-D views, and at least one of the screens also employs touch-sensitive technology for enhanced interaction with associated games. To further enhance the interactive experience, a stylus is provided with the game for activating the touch screen, and a blind bore is provided in the main body for storing the stylus when it is not being used.

The main body of the device is also provided with all of the game control buttons. Most of the control buttons are on the inner face of the main body, on either side of the display screen, along with microphone, recharge, and power indicators. The rearward portion of a peripheral edge surrounding the main body also supports an additional pair of buttons for game control. The peripheral edge of the main body also provides access to various other features and functions of the device. For example, a forward portion of the peripheral edge incorporates a volume control slide, a first game card slot as well as headphone/microphone connectors. The rearward portion of the peripheral edge is provided with, in addition to the control buttons, an external extension connector for connecting an AC adaptor that can be used to either recharge the internal battery or to operate the game device using household power; a wrist strap attachment mechanism; the stylus port; and a second game slot. This second game card slot may, for example, accommodate game cards from other game systems such as other game systems manufactured by the assignee of this application.

In addition to the LCD on the inner face of the cover body, the latter is also provided with a pair of stereo speakers, one on either side of the display screen.

In accordance with a feature of an example embodiment, the portable game machine includes hardware/software capable of simultaneously displaying different three-dimensional images on two display units by using a single three-dimensional image processing unit without causing flicker on the display screens.

Also, another feature of an example embodiment is to make it possible for a portable game machine to include two display units, at least one two-dimensional image processing unit, and a single three-dimensional image processing unit, wherein a game image generated by the two-dimensional image processing unit is displayed on one of the display units and a game image generated by the three-dimensional image processing unit is displayed on the other display unit, and to simultaneously display different three-dimensional game images on the two display units without adding another three-dimensional image processing unit or substantially changing the configuration of the portable game machine.

Example handheld portable game devices and emulators of these handheld portable game devices will now be described in detail in connection with the drawings identified below.

DETAILED DESCRIPTION OF EXAMPLE EMBODIMENTS

Overall Exemplary Illustrative System

Figure 1:
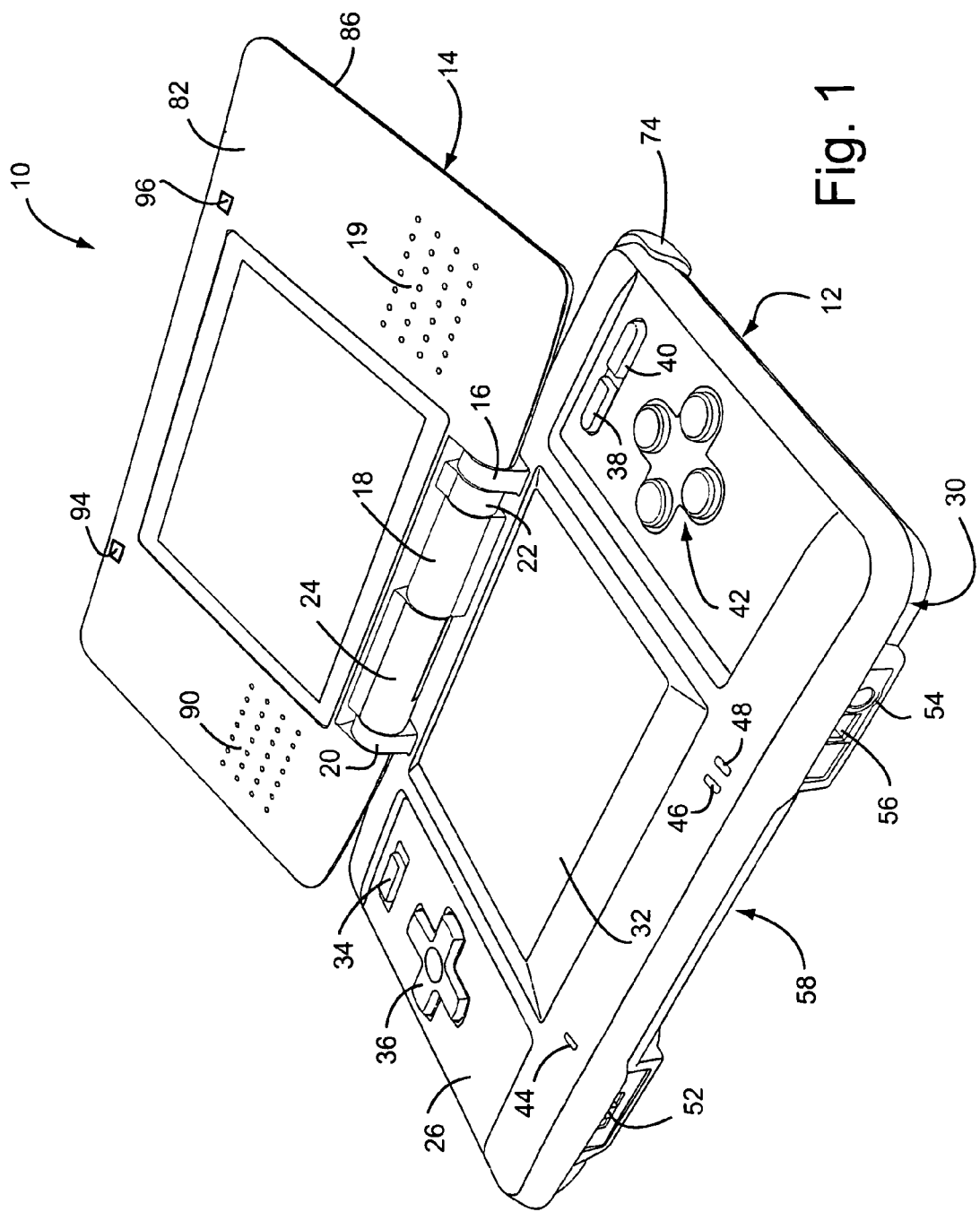
FIG. 1 is a perspective view of the electronic game and communications device in accordance with an example embodiment, with the device shown in an open, ready-to-use orientation.
Figure 2:
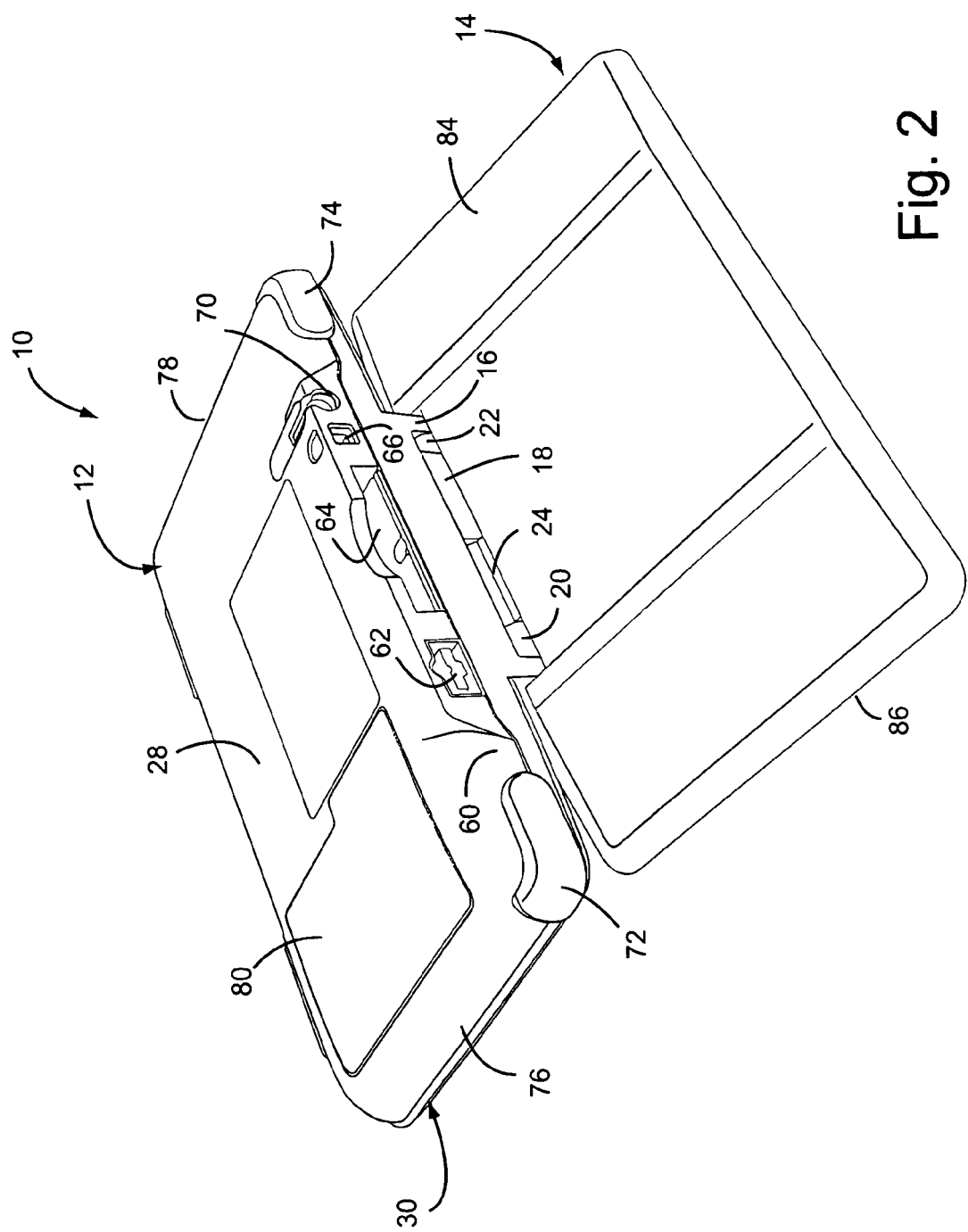
FIG. 2 is a inverted perspective view of the game device shown in FIG. 1.

Referring to FIGS. 1 and 2, in an illustrative example embodiment the game system or console 10 includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game device where the cover body 14 is in an open position and the game is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body. When the cover body 14 is in its fully open position, it is substantially parallel to the main body 12 but lies in a substantially parallel, offset plane. The main body 12 also has a lower (or outer) face 28 (FIG. 2) and a peripheral edge 30.

A first display screen 32 is recessed within the upper face 26 of the main body 12 with dimensions of approximately 2½ inches in length and 1⅞ inches in width, yielding a diagonal screen dimension of 3 inches. The screen in the example embodiment is a backlit (e.g., 40 candelas), color liquid crystal display (LCD) with a display resolution of 256×192 dots (aspect ratio 4:3). This screen is touch sensitive and may be activated by a stylus, described further herein. A power button 34 is located in the upper left corner of face 26 and is used to turn the game console on and off. A cross-shaped directional control button 36 is located adjacent and below the power button 34, and is used for game play control.

Figure 2A:
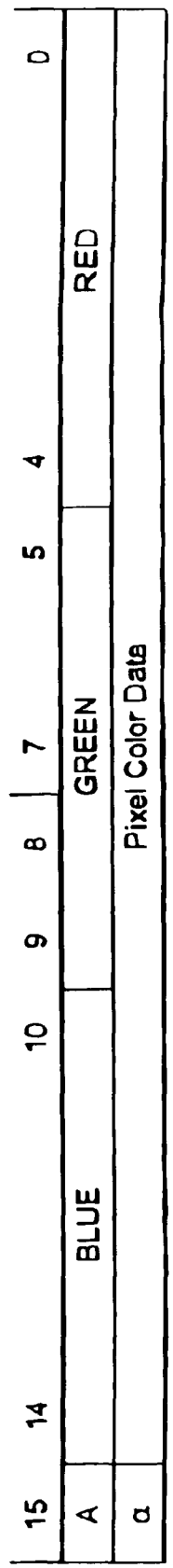
FIGS. 2(a) and 2(b) show an example of a touch panel display structure usable for the example portable game system.
Figure 2B:
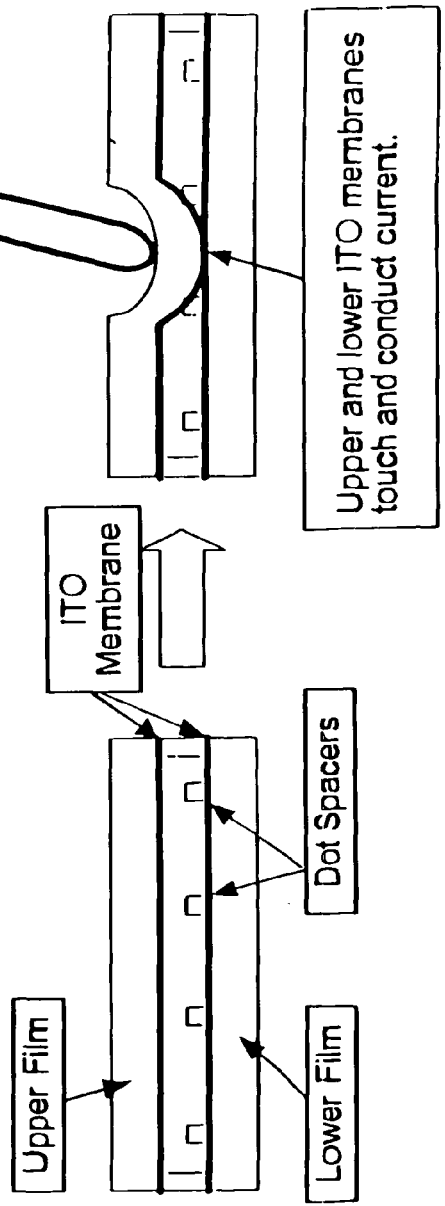

More specifically, display screen 32 includes a resistive-membrane touch panel that allows coordinates to be obtained in dot units. The touch panel can be operated with a finger or a stylus. The touch panel input data includes x-coordinate (e.g., 8 bits); y-coordinate (e.g., 8 bits); touch determination flag (e.g., 1 bit); and data validity flag (e.g., 2 bits). In the example portable game system, the touch panel must be pressed down with a force that exceeds a specified value, e.g., 80 g, for the location to be detected. The details of the input data for the touch panel are shown below:

x-coordinate, y-coordinate x-coordinate: 0-255 (dots) y-coordinate: 0-191(dots)

touch determination flag 0: the touch panel is not being touched 1: the touch panel is being touched data validity flag 00: both the x-coordinate and y-coordinate are valid 01: the x-coordinate is invalid 10: the y-coordinate is invalid 11: both the x-coordinate and y-coordinate are invalid FIGS. 2(a) and 2(b) show an example touch panel structure which includes an upper film 902, a lower film 904, transparent conducting membranes 906, 908 and dot spacers 910. As shown in FIG. 2(a), normally, the space formed between the upper and lower films 902, 904, each of which is respectively coated with a transparent conducting membrane 906, 908 (such as an indium-tin-oxide (ITO) membrane), prevents current from being conducted. When a finger or stylus presses on the panel as shown in FIG. 2(b), the pressure causes the upper and lower films to touch and conduct current. The dot spacers 910 prevent erroneous input and the example portable game system from being continuously on.

In the example portable game system, the touch panel structure extends over all or substantially all of the display screen. It is of course possible, if desired, to provide the touch input only over a portion of the display screen.

In the upper right corner of the main body 12, there are side-by-side "start" and "select" buttons 38, 40, respectively, with X/Y/A/B buttons 42 located adjacent and below the "start" and select" buttons. Buttons 38, 40 and 42 are also used for game play control. A microphone 44 (which may, for example, be an omni-directional condenser microphone) is located below the left edge of screen 32 for use with specially designed games or other applications (e.g., voice chat) having a microphone feature. A battery recharge indicator LED 46 and a power indicator LED 48 are also located on the upper face 26, adjacent the lower edge thereof, below the right edge of screen 32.

Figure 3:
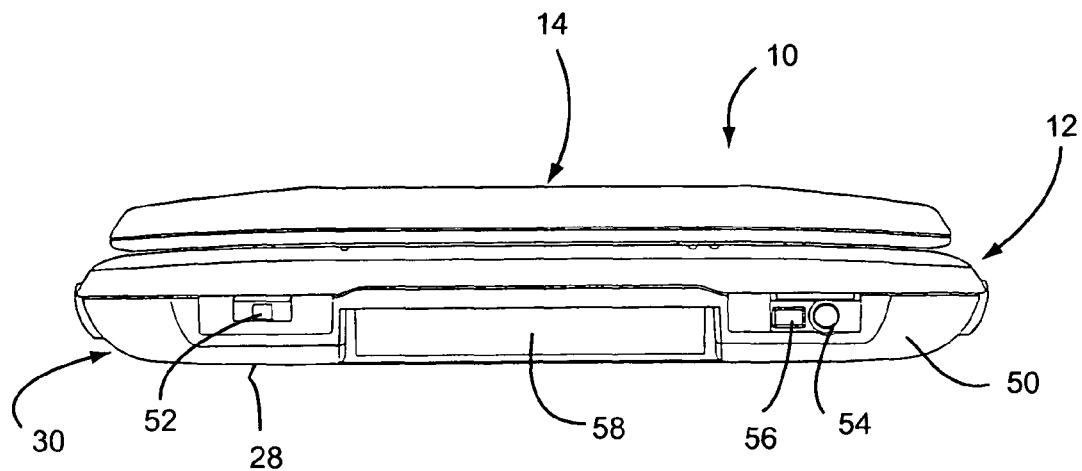
FIG. 3 is a front elevation of the device shown in FIG. 1, but with the game shown in a closed position.
Figure 4:
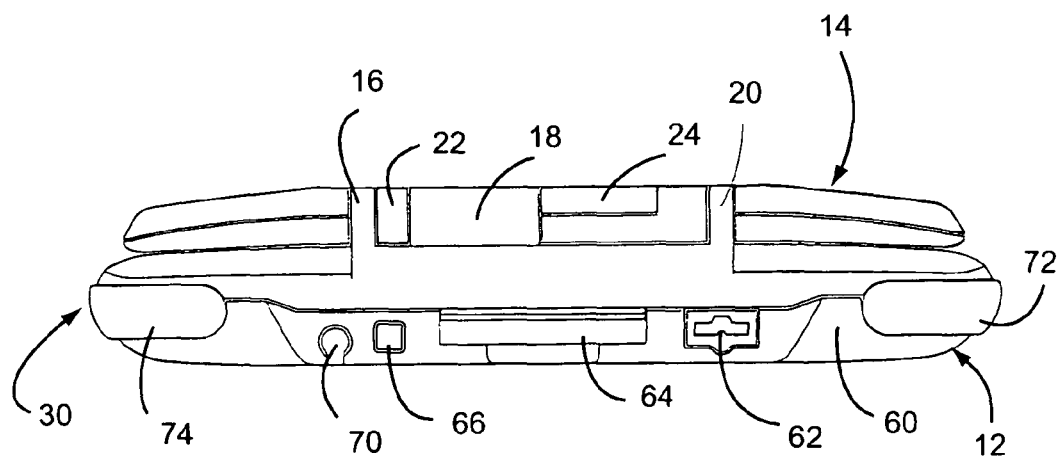
FIG. 4 is a rear elevation of the device shown in FIG. 3.

With reference now especially to FIG. 3, a lower or forward portion 50 of the peripheral edge 30 (closest to the user) is provided with a volume control slide 52 and headphone and microphone connectors 54, 56 on either side of a first game slot 58. In the example portable game system, slot 58 is especially designed for larger game cartridges or cards originally designed for use with the assignee's Game Boy Advance® game system. Of course, slot 28 may be otherwise designed and the invention is not limited in this respect.

Figure 5:
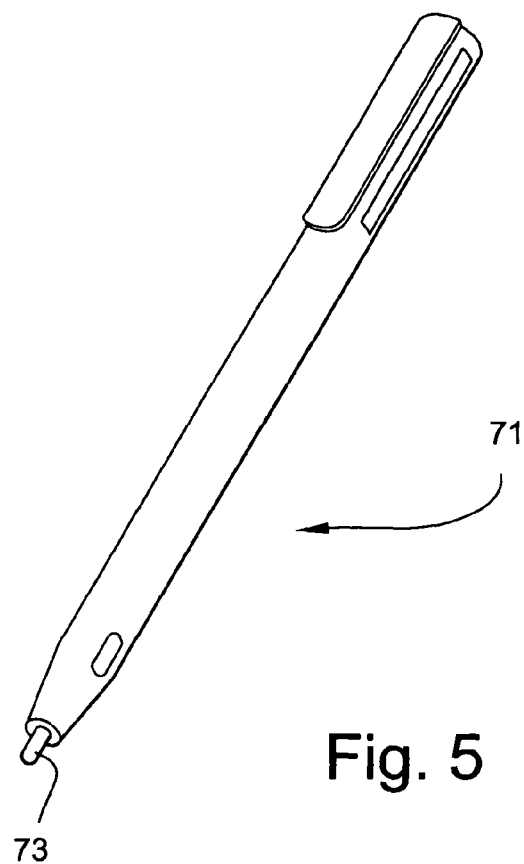
FIG. 5 is a perspective view of a stylus for use with the game device shown in FIGS. 1-4.

As best seen in FIG. 2, an upper or rearward portion 60 of the peripheral edge 30 is provided with an external extension connector 62 that permits connection to an AC adapter for recharging the internal battery (not shown), or for operating the game using household power. A second game slot 64 in edge portion 60 is designed for receiving memory or game cards especially designed for this example game system. The second game slot 64 is smaller than the first game slot 58, reflecting the different sizes of the game cards. Openings 66, 68 form an elbow-shaped through slot adapted for securing a wrist strap (not shown), thereby enabling the user to secure the game system to the body and thus minimize the potential for losing, misplacing or dropping the game system. A stylus port or holder, in the form of a blind bore 70 is located adjacent the wrist-strap mount for holding a stylus 71 (FIG. 5) before or after use.

The stylus 71 is a plastic pencil-shaped device with a rounded tip 73 and is used to activate the touch screen 32.

A pair of left, right control buttons (or shoulder buttons) 72, 74 are located on the peripheral edge 30, at the corners where the upper portion 60 of the peripheral edge 30 meets the side portions 76, 78 of the peripheral edge. The location of these buttons and the location of previously described buttons 34, 36 and 42 facilitate manipulation game control by the user's thumbs and index fingers when the game is held with two hands in a natural and intuitive manner.

The lower (or outer) face 28 of the main body is provided with a battery cover 80 (FIG. 2) for accessing a rechargeable battery pack located within the main body.

The cover body 14 also has an upper (or inner) face 82 (FIG. 1) and a lower (or outer) face 84 (FIG. 2) connected by a peripheral edge 86. The upper face 60 incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body. In this example portable game system, screen 88 is not provided with a touch panel structure. Of course, the invention is not limited in this respect and screen 88 may, if desired, be provided with a touch panel structure that extends over all, substantially all, or a part of the display screen.

Exemplary External Device Interface

Exemplary system 10 includes external interfaces in the form of slot 64 that can accept a connector to an additional device including but not limited to a game memory. As already noted, external game card slot 58 is sized and adapted to receive a conventional game card designed for the by now well known Nintendo Gameboy Advance System® or any other device compatible therewith. The game slot on system 10 is, as described herein, disposed within an insertion port and designed to receive an insertable memory device such as a non-volatile ROM card, but could accept and/or interface with any of a variety of other types of peripheral or other devices including but not limited to communications adapters (wireless, wired, Ethernet, broadband, etc.), processors (DSPs, microprocessors, graphics processors, etc.), input/output devices (e.g., keyboards, pointing devices, etc.), digital camera devices, printing or other imaging devices, music players or portions thereof, radio receivers, satellite receivers, television receivers, or any other peripheral device imaginable.

Figure 6:
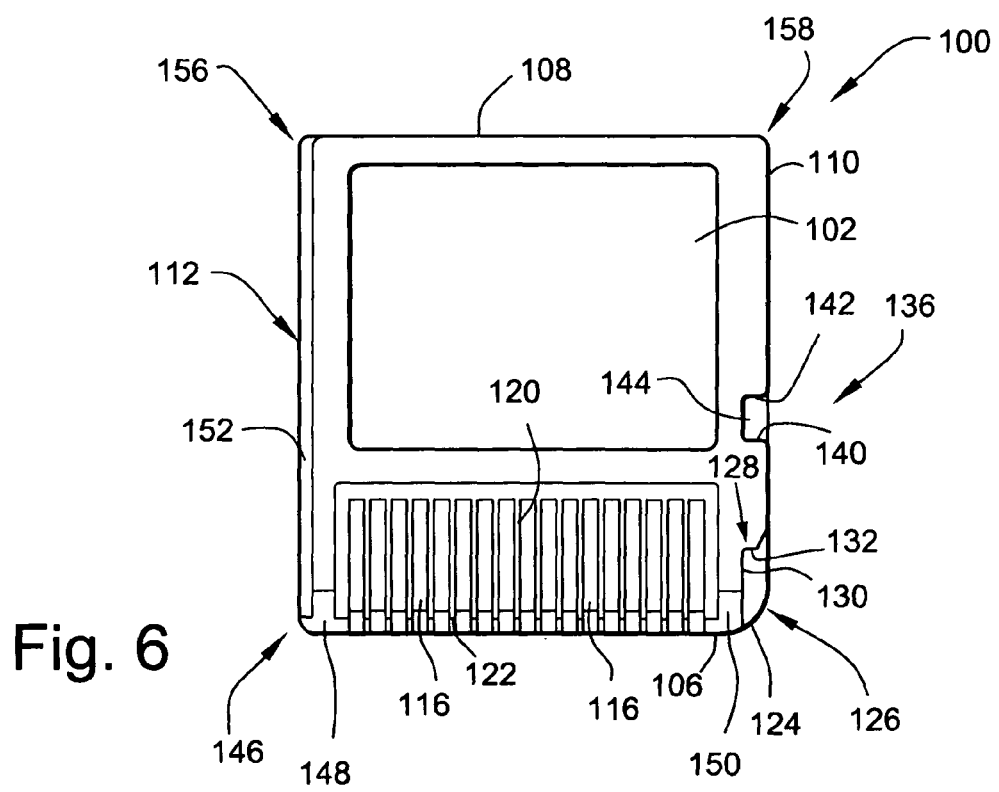
FIG. 6 is a plan view of a game card for use with the game device shown in FIGS. 1-4.
Figure 7:
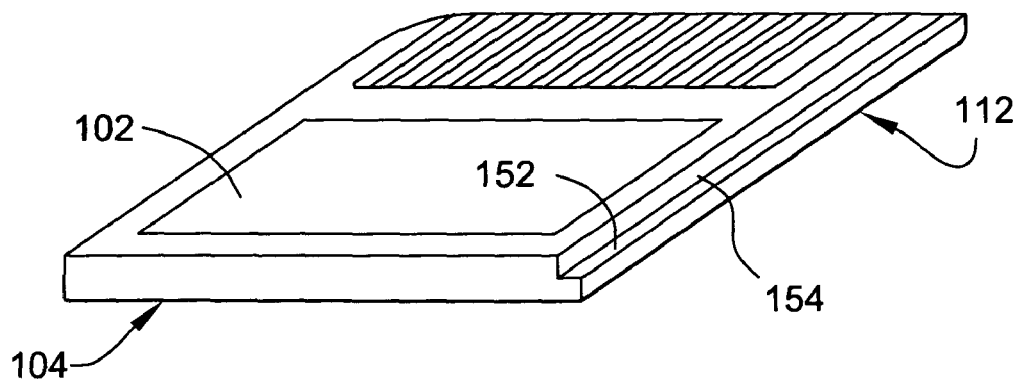
FIG. 7 is a rear perspective view of the game card shown in FIG. 6.
Figure 8:
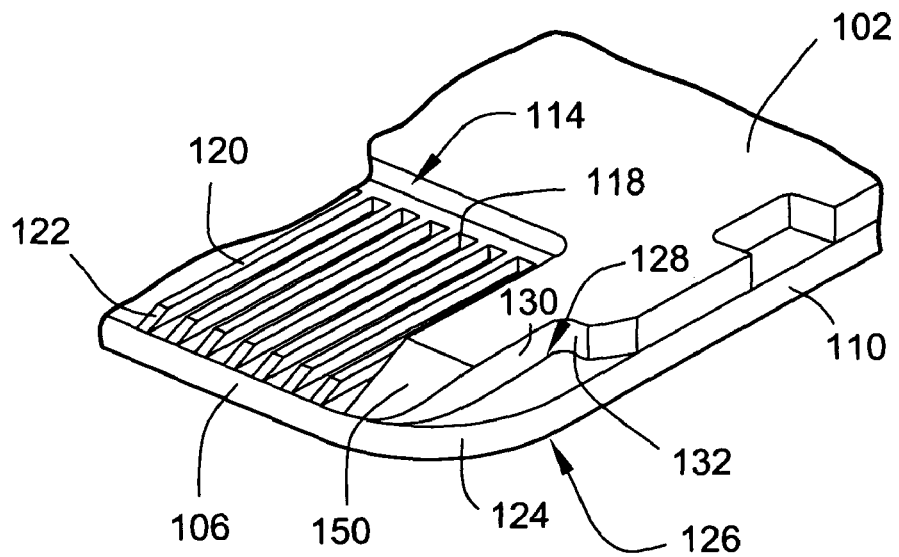
FIG. 8 is an enlarged perspective view of a front, right corner of the card shown in FIG. 6.

An exemplary new game or memory card or other device 100 designed especially for use with this game device is shown in FIGS. 6, 7 and 8.

One exemplary illustrative game or memory card 100 that may be used with system 10 is preferably of molded plastic or other construction and has substantially planar or other upper and lower surfaces 102, 104, respectively, a forward edge 106, rearward edge 108 and side edges 110, 112. The forward end of the upper surface 102 may be formed with a rectangular recess 114 in which a plurality of terminal strips 116 can be located, extending from a rear wall 118 of the recess to the forward edge 106 of the card. The rearward wall 115 of the recess may be substantially perpendicular to the upper and lower surfaces 102, 104 but, as a practical matter, can be sloped by no more than about 3 degrees to facilitate removal of the card from the mold during manufacture of the card. The terminal strips 116 are parallel to each other and are separated by raised ribs 120 that also extend from the rear wall 118 to the forward edge 106. The free ends 122 of the ribs 120 can be chamfered as best seen in FIG. 8 to facilitate sliding entry of the card into the slot 58 in the main body 12. Ribs 120 also protect the terminal strips 116 from contact with the users' hands or other objects. The recess 114 and array of terminal strips 116 can be centered along the forward edge 106 of the card, or, in one exemplary illustrative implementation, offset laterally toward the side edge 112 for a purpose explained in greater detail below. Terminal strips 116 need not be adjacent—in some implementations certain strips can be omitted for example.

In one specific exemplary illustrative implementation shown in FIGS. 6-8, an enlarged radius 124 is formed at forward corner 126 where the side edge 110 meets forward edge 106. A first notch 128 is formed in corner 126, defined by a vertical notch side wall 130, a vertical notch back wall 132 and a flat notch bottom wall 134. The latter is parallel to the upper and lower card surfaces 102, 104, while notch side wall 130 is parallel to side edges 110,112, and notch back wall is perpendicular to the notch side wall 130 and parallel to the card forward edge 106. The depth of the notch can be about half the approximate ⅛ inch thickness of the card, and the length of the notch is about ¼ inch, which in turn, is about half the length of the recess 114. Rearwardly of the notch 128, along the card side edge 110, there is formed a second notch 136 that opens to the side of the card, defined by parallel side walls 140, 142 and a back wall 144. Side walls 140, 142 are parallel to forward and rearward card edges 106, 108 while back wall 144 is parallel to card side edges 110, 112. An angled surface 145 connects back wall 144 to the edge 110. Here again, the depth of the notch is about half the thickness of the card, and the length of the notch is about ⅛ inch.

Notches 128 and 136 may cooperate with components of a "push-push" mechanism inside the game slot 64 to provide controlled, spring-loaded movement of the game card during insertion and ejection.

The opposite forward corner 146 of the card where side edge 112 meets forward edge 106 is defined by a smaller radius than radius 124. Note that the forward surfaces 148, 150 of the card on either side of the recess 114 are also chamfered to substantially the same degree as the chamfer on ribs 120.

Side edge 112 is stepped along its entire length in the upper plane of the card only, as defined by horizontal shoulder 152 that is parallel to upper and lower surfaces 102, 104 and a recessed edge portion shoulder 154 that is parallel to the side edges 110, 112. This shoulder insures correct orientation of the card when inserted into a game system slot.

The rearward edge 108 of the card is substantially uniform in profile from side edge 110 to side edge 112, with both rearward corners 156, 158 rounded by a radii similar to the radius at corner 146.

The dimensions of the card may be matched to the game system entry slot, and in the exemplary embodiment, the card 100 is substantially square, with a length dimension (front-to-back) of 1⅜", and a width dimension (side-to-side) of 1¼". Thus, system 10 may define a game slot that closely matches the outside dimensions of the card 100 and into which the card is at least in part inserted. However, other, non-insertable devices could be coupled to the system 10 by inserting a connector portion into the same slot.

Figure 8A:
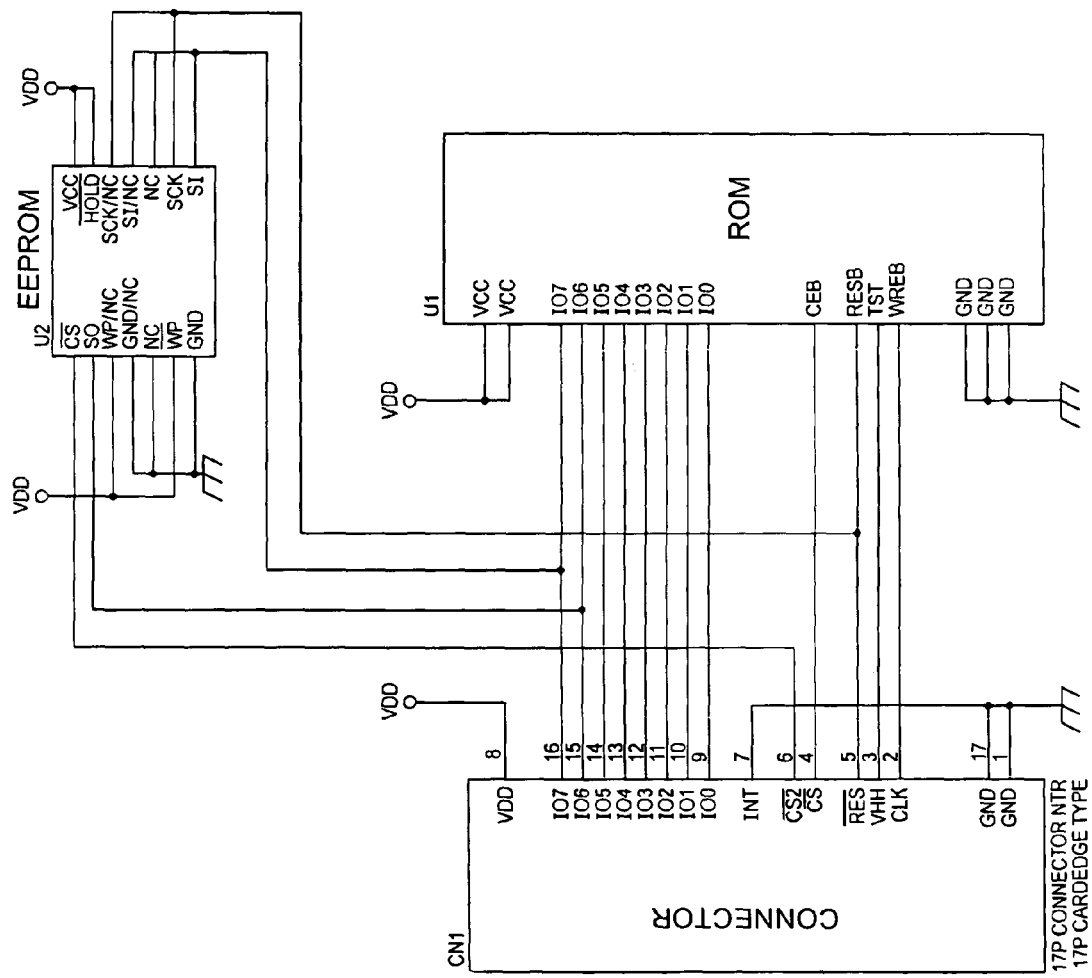
FIG. 8A is a block diagram showing example components for the game card of FIGS. 6-8.
Figure 8B:
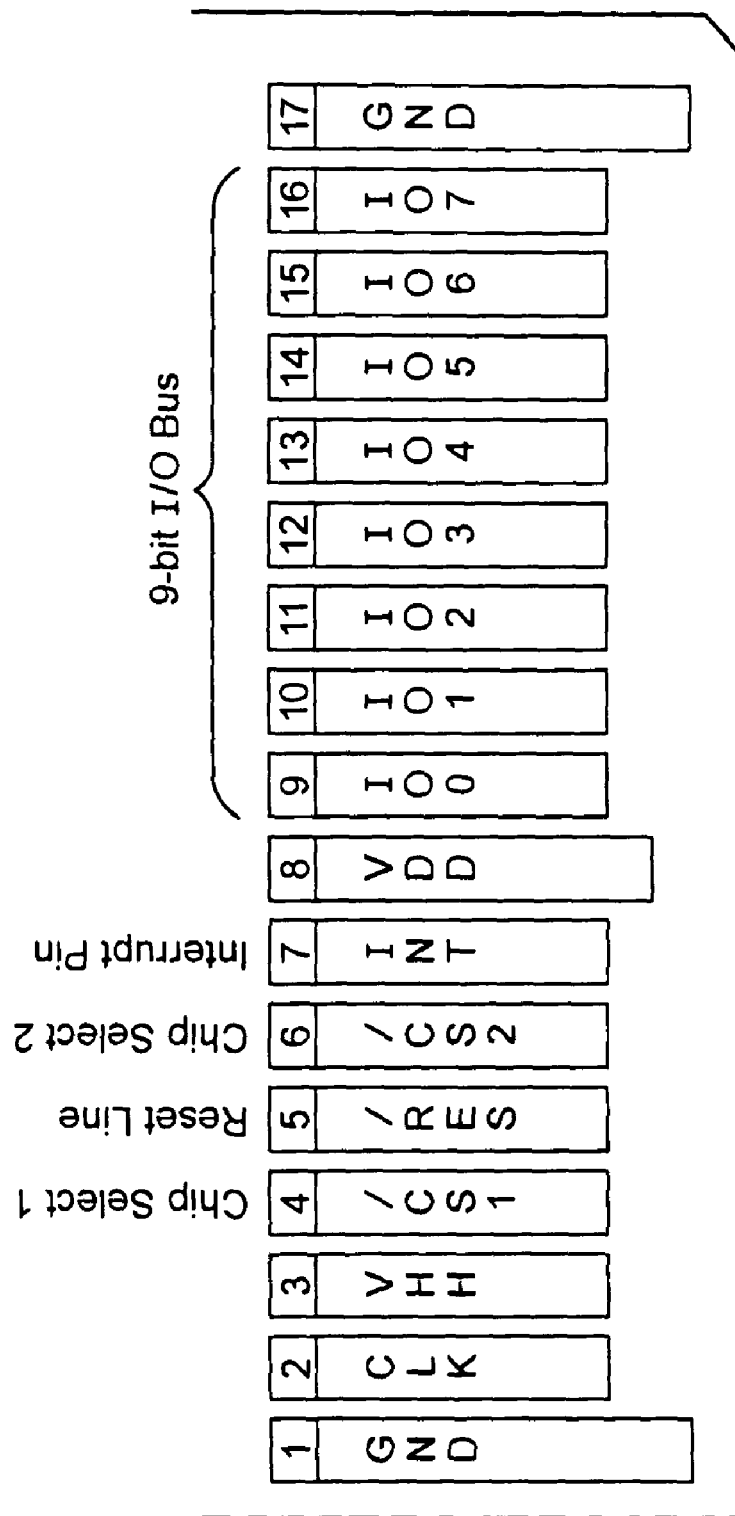
FIG. 8B shows an example arrangement of terminal strips for the game card of FIG. 6.

When inserted into the game system entry slot, card 100 is electrically connected via the terminal strips 116 to the processing circuitry of the example portable game system (see FIGS. 8A and 8B). In this way, the processing circuitry can access the electrical components on the card. For example, if the card includes a memory, the processing circuitry can read data from and/or write data to the memory on the card. The electrical components on the card are of course not limited a memory.

More specifically, when card 100 is inserted into the game system entry slot of the example portable game system, the terminal strips 116 electrically contact or mate with corresponding electrical contacts within example portable game system. This action electrically connects the electrical components to the electronics within the example portable game system. The electrical components of card 100 may include any electrical or electronic device, such as a memory device, a processing device, etc. In one example implementation, a ROM is used that stores instructions and other information pertaining to a particular video game. The ROM for one card 100 may, for example, contain instructions and other information for an adventure game while the ROM of another card 100 may contain instructions and other information for a car race game, an educational game, etc. To play a game, a user of the example portable game system need only connect an appropriate card 100 into slot 58—thereby connecting the card's ROM (and any other circuitry it may contain) to the example portable game system. This enables the electronics of the example portable game system to access information contained within the ROM, which information controls the game system to play the appropriate video game by displaying images and reproducing sound as specified under control of the ROM game program information.

FIG. 8A is a block diagram showing example components for an exemplary game card or other device of FIGS. 6-8. Game card 100 shown in FIG. 8A includes a 17-pin connector CN1, a ROM U1 (e.g., 44P TSOP2) and an EEPROM U2 (e.g., 8/14P TSSOP). Pins 2 and 23 of ROM U1 are connected to VDD and pins 3, 22 and 41 are connected to ground. ROM U1 is reset at start-up by a signal provided by the/RES (reset) terminal. In this exemplary illustrative implementation, when/CS is low, ROM U1 of card 100 is accessed in a parallel bus mode via terminals IO0 to IO7 and when/CS2 is low, EEPROM U2 of card 100 is accessed in SPI (serial peripheral interface) mode in which terminal IO7 is a serial input terminal and terminal IO6 is a serial output terminal.

FIG. 8B shows an example arrangement of terminal strips interface 116 for card 100 (and also corresponding terminal strips within the iunterface slot of system 10). The following table summarizes an exemplary terminal arrangement:

| 1 | GND |
|---|---|
| 2 | CLK |
| 3 | VHH |
| 4 | /CS1 |
| 5 | /RES (reset) |
| 6 | /CS2 |
| 7 | INT (interrupt) |
| 8 | VDD |
| 9 | IO0 |
| 10 | IO1 |
| 11 | IO2 |
| 12 | IO3 |
| 13 | IO4 |
| 14 | IO5 |
| 15 | IO6 |
| 16 | IO7 |
| 17 | GND |

Exemplary Illustrative More Detailed Implementation

Figure 9:
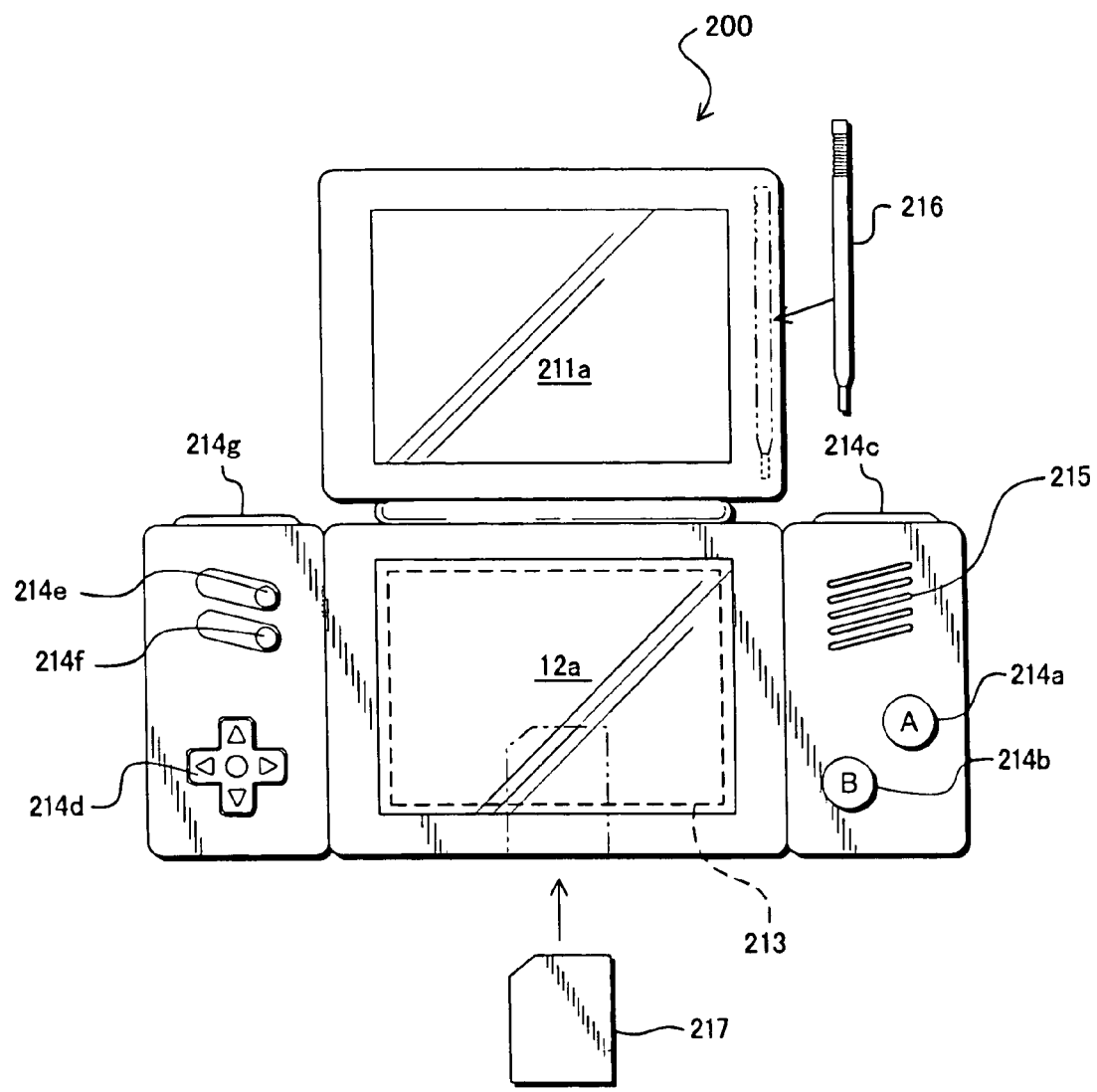
FIG. 9 is an external view of a portable game machine according to a further example embodiment.

FIG. 9 is a further illustrative embodiment of a portable game machine 200. As with the prior embodiment, a further example game machine physically including two display screens with one of the display screens being covered with a touch panel is exemplarily described. In the present embodiment, a game image is displayed on at least the display screen covered with the touch panel. Also, a non-portable video game machine, an arcade game machine, a portable terminal, a cellular phone, or a personal computer may be used as the game machine.

FIG. 9 is an external view of the portable game machine 200. As shown in FIG. 9, the portable game machine 200 includes two display screens, that is, a first display screen 211a and a second display screen 212a. The surface of the second display screen 212a is covered with a touch panel 213. Also, to the right of the second display screen 212a, the game machine includes an A button 214a, a B button 214b, and an R switch 214c, which are operable by the right hand of the player, and a loudspeaker 215 for producing game music. To the left of the second display screen 212a, the game machine includes a cross key 214d, a start button 214e, a select button 214f, and an L switch 214g, which are operable by the left hand of the player. Also, the portable game machine 200 includes a removable stylus 216 for input to the touch panel 213. Furthermore, the portable game machine 200 has, removably inserted therein, a cartridge 217, which is a storage medium having stored therein a game program of the illustrative embodiments. Note that, in the present embodiment, the touch panel 213 is exemplarily provided as an input unit, but this does not restrict the present invention.

Figure 10:
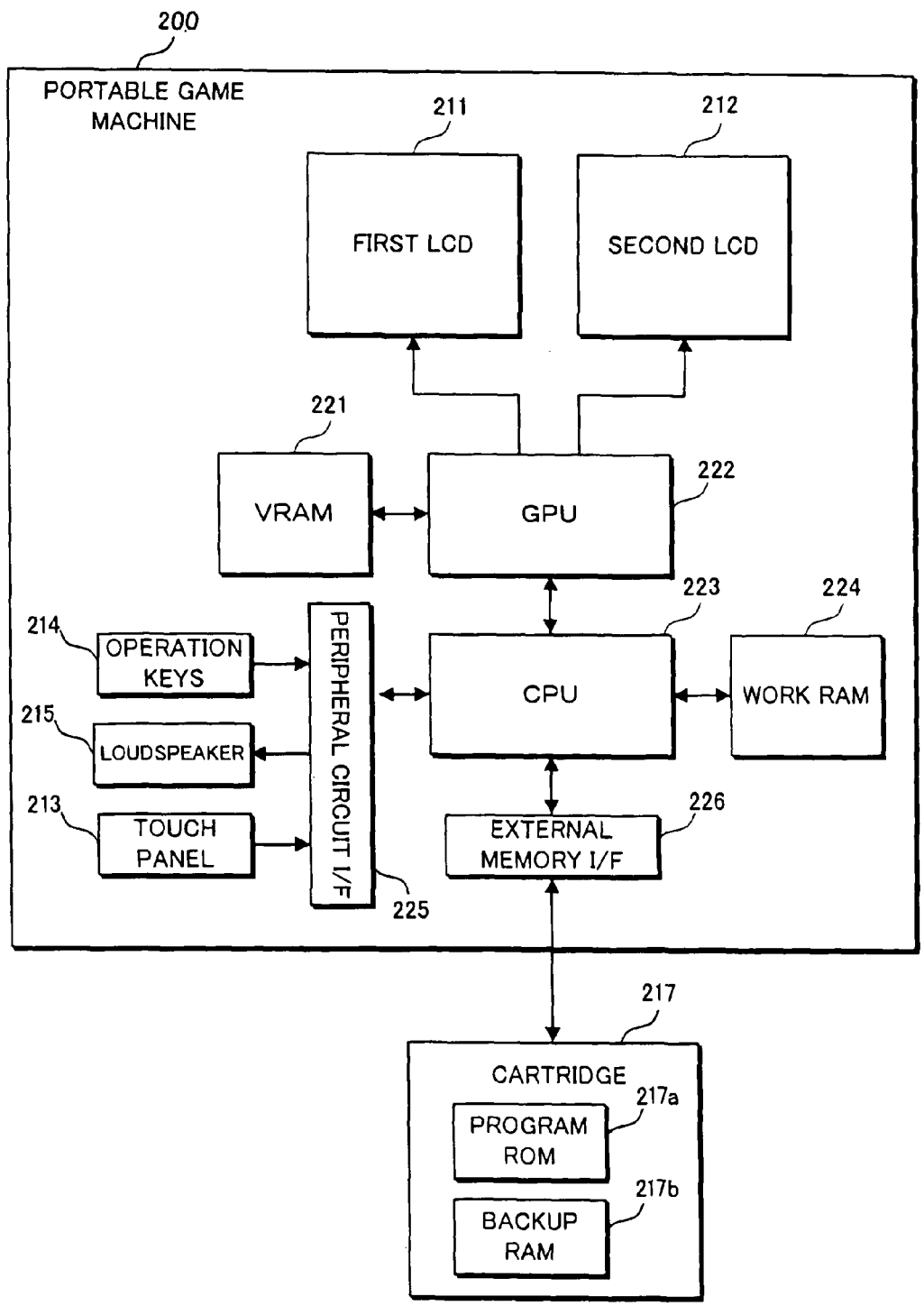
FIG. 10 is an illustration showing an internal configuration of a portable game machine.

FIG. 10 is a block diagram showing the portable game machine 200. It should be understood that the hardware/software and operational description which follows is applicable to the illustrative embodiment shown in FIGS. 1-8 as well as the illustrative embodiment shown in FIG. 9. As shown in FIG. 10, the portable game machine 200 includes a CPU (central processing unit) 223, which is an example of a computer for executing the game program, and other components. The CPU 223 includes a work RAM (working storage unit) 224, a GPU (graphic processing unit) 222, and a peripheral circuit I/F (interface) 225 that are electrically connected to one another. The work RAM 224 is a memory for temporarily storing, for example, the game program to be executed by the CPU 223 and calculation results of the CPU 223. The GPU 222 uses, in response to an instruction from the CPU 223, a VRAM 221 to generate a game image for display output to a first LCD (liquid crystal display unit) 211 and a second LCD 212, and causes the generated game image to be displayed on the first display screen 211a of the first LCD 211 and the second display screen 212a of the second LCD 212. The peripheral circuit I/F 225 is a circuit for transmitting and receiving data between external input/output units, such as the touch panel 213, the operation keys 214, and the loudspeaker 215, and the CPU 223. The touch panel 213 (including a device driver for the touch panel) outputs coordinate data corresponding to a position input (specified) with the stylus 216.

Furthermore, the CPU 223 is electrically connected to the external memory I/F 226, in which the cartridge 217 is inserted. The cartridge 217 is a storage medium for storing the game program and, specifically, includes a program ROM 217a for storing the game program and a backup RAM 217b for rewritably storing backup data. The game program stored in the program ROM 217a of the cartridge 217 is loaded to the work RAM 224 and is then executed by the CPU 223. In the present embodiment, an exemplary case is described in which the game program is supplied from an external storage medium to the portable game machine 200. However, the game program may be stored in a non-volatile memory incorporated in advance in the portable game machine 200, or may be supplied to the portable game machine 200 via a wired or wireless communication circuit.

An example geometry engine has the following features:
operates at 33.514 MHz
maximum 4 million vertices/second
6-plane clipping
Lighting (4 parallel light sources)
matrix stack
texture coordinate conversion
box culling test
An example rendering engine has the following features:
operates at 33.514 MHz
maximum 120 thousand polygons/second
maximum 30 million pixels/second triangular and quadrilateral rendering
texture format: 4-, 16-, and 256-color palette formats bitmap format 4×4 texel compression format
   translucent (A315, A513) format
   texture size: 8×8 to 1024×1024
   alpha blending
   alpha test
   fog
   toon shading
   edge marking
   anti-aliasing Example Emulator System Some or all of the above-described system components could be implemented as other than the hand-held system configurations described above.

An emulator system, for example, might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of the system. The emulator could also comprise a personal digital assistant (PDA) that simulates the hardware and/or firmware of the system. An emulator may execute the game software so that a particular game functions and/or appears somewhat differently from how it functions and/or appears on its intended platform. Thus, the emulator may show a color game in monochrome or a play a game without its accompanying sound. Emulation as used herein is intended to include emulation that results in these and other such differences in function and appearance.

Some general purpose digital computers (e.g., IBM or MacIntosh personal computers and compatibles) are equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of the system. Emulator software controls the hardware resources on the personal computer platform to simulate the processing, graphics, sound, peripheral and other capabilities of the portable game system platform for which the game programmer wrote the game software. Similarly, PDAs and other handheld communication devices such as mobile telephones running emulator software may have sufficient performance to approximate the graphics and sound performance of the system.

U.S. Pat. No. 6,672,963 (the contents of which are incorporated herein in their entirety) discloses a software emulator that maintains high-quality graphics and sound in real time across a wide variety of video games and other applications. The emulator disclosed in the '963 patent achieves this through a unique combination of features and optimizations including, for example:

use of a virtual liquid crystal display controller (state machine) to maintain real time synchronization with events as they would occur on the native platform, use of a hardware-assisted bit BLIT memory transfer operation to efficiently transfer graphics information into video memory, pre-computed translation table for translating native platform graphics character formats into formats more compatible with standard graphics adapters, emulation of native platform color palette information to provide compatibility with games and other applications that change color palettes within a frame, emulation of major registers and other hardware-based memory structures within the native platform in RAM under software control, use of a jump table able to efficiently parse incoming binary instruction formats, use of a unique page table to control memory access by remapping memory access instructions into different memory locations and/or function calls, availability of a ROM protection function to eliminate ROM overwriting during emulated operations, responsive to video game compatibility modes and registration data, models native platform using state machine defining search, transfer, horizontal blank and vertical blank states, cycle counter to determine when a modeled state has expired and transition to a new state is desired, selective frame display update skipping while maintaining execution of all instructions to maintain state information while minimizing game play slowdowns, optional NOP loop look ahead feature to avoid wasting processing time in NOP loops, redundant emulated RAM and ROM storage to optimize execution efficiency, separate page tables for read and write operations, modeling of native microprocessor registers as a union of byte, word and long register formats, modeling native instruction CPU flags to allow efficient updating after operations are performed by target platform microprocessor, mapping emulated program counter into target platform microprocessor general purpose register, reads and writes via index register go through pointer tables to increase execution efficiency, adaptable input controller emulator to provide user inputs from a variety of different user input devices, emulated object attribute memory, and use of screen memory buffers larger than screen size to increase paging efficiency by eliminating clipping calculations and using the hardware BitBlt to transfer a subset of the memory buffer to displayed video memory.

It will be recognized that some or all of the various features and optimizations described in the '963 patent are applicable to emulate the example portable game systems described herein.

As described below, an emulator for the example portable game system described above may run on a hand-held computing system such as a PDA or a hand-held communication device such as a mobile telephone. Such devices typically have a single display screen and thus the emulator will need to determine how to present Display Output A and Display Output B (see, e.g., FIG. 25) on this single display screen.

For example, the emulator could effectively divide the single display screen into two display areas and respectively provide Display Output A and Display Output B in each of these display areas. These display areas need not be the same size and the emulator may provide the "main" display output to a larger one of the display areas.

In still other instances, the emulator may provide only one of the Display Outputs A and B to the screen of the hand-held computing system or hand-held communication device. The one output that is provided to the screen need not be the same throughout the game. Thus, for example, Display Output A may be provided at some times and Display Output B may output at other times.

In addition, the display area on the single display screen for Display Output A and the display area on the single display screen for Display Output B may be oriented differently (e.g., one horizontally oriented and the other vertically oriented). This may facilitate display of the two Display Outputs at the same time.

In other instances, one of the Display Outputs A and B may be provided to the screen while the other one is made to be accessible upon supplying a predetermined input or inputs to the hand-held computing system or hand-held communication device. Thus, for example, a player may provide a predetermined input (such as a key press or a touch screen input) to switch between one Display Output and the other.

In addition, as described above, one of the display screens of the example portable game system is touch-sensitive. If the display screen of the hand-held computing system or hand-held communication device is divided into two display areas, the emulator may configure one of the display areas to receive touch inputs during game play. Preferably, this one of the display areas would be the display area displaying the output that would be displayed on the touch screen of the example portable game system. Touch inputs to the other one of the display areas would preferably be ignored.

If the emulator outputs only one of Display Output A and Display Output B at a time to the single screen display of the PDA or hand-held communication device, touch inputs may be supplied by the player when the Display Output output to the touch screen of the example portable game system is displayed. If this screen is subsequently switched to the other of the two screens, touch inputs may be ignored.

Because there will likely be differences between the size of the touchscreen of the example portable game system and the size of the screen of the hand-held computing system or hand-held communication device, the emulator will need to appropriately scale the touch screen inputs.

An emulator of the example portable game systems may implement some or all of the following:
  flipping back and forth between displays for each of the two screens of the original platform
  frame skipping to keep up with display
  emulation of two processors (e.g., ARM7 and ARM 9 cores)
  emulation of touch screen of original platform with target platform touch screen (including, e.g, conversion or scaling for differently sized screen)
  emulation of some or all of the graphics pipeline (even if the target platform has some hardware graphics capability, the emulator may provide some conversion from the original platform graphics API to the target platform graphics API)

Figure 11A:
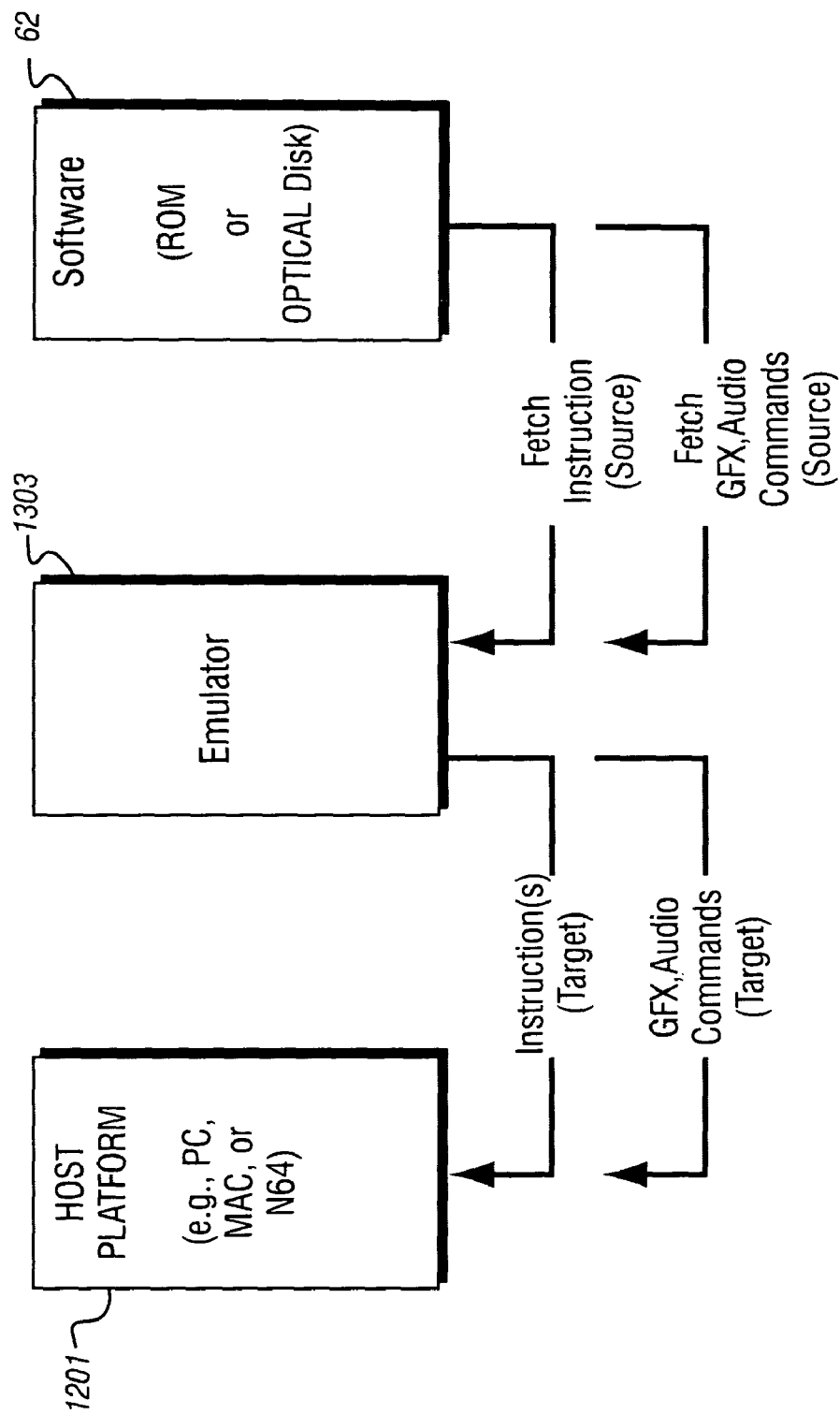
FIGS. 11(a)-11(c) show example alternative compatible implementations.

FIG. 11A illustrates an example overall emulation process using a host platform 1201, an emulator component 1303, and a game software executable binary image provided on a storage medium 62. Host 1201 may be a general or special purpose digital computing device such as, for example, a personal computer, a laptop computer, a palm-top computer, a video game console, a portable game system, a personal digital assistant, an internet appliance, a set-top box, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by portable game system 10 from storage medium 62 and converts these program instructions to a target format that can be executed or otherwise processed by host 1201.

As one example, in the case where the software is written for execution on a platform using a specific processor and the host 1201 is a personal computer using a different (e.g., Intel) processor, emulator 1203 fetches one or a sequence of binary-image program instructions from storage medium 62 and converts these program instructions to one or more equivalent Intel binary-image program instructions. The emulator 1203 also fetches and/or generates graphics commands and audio commands and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 11B:
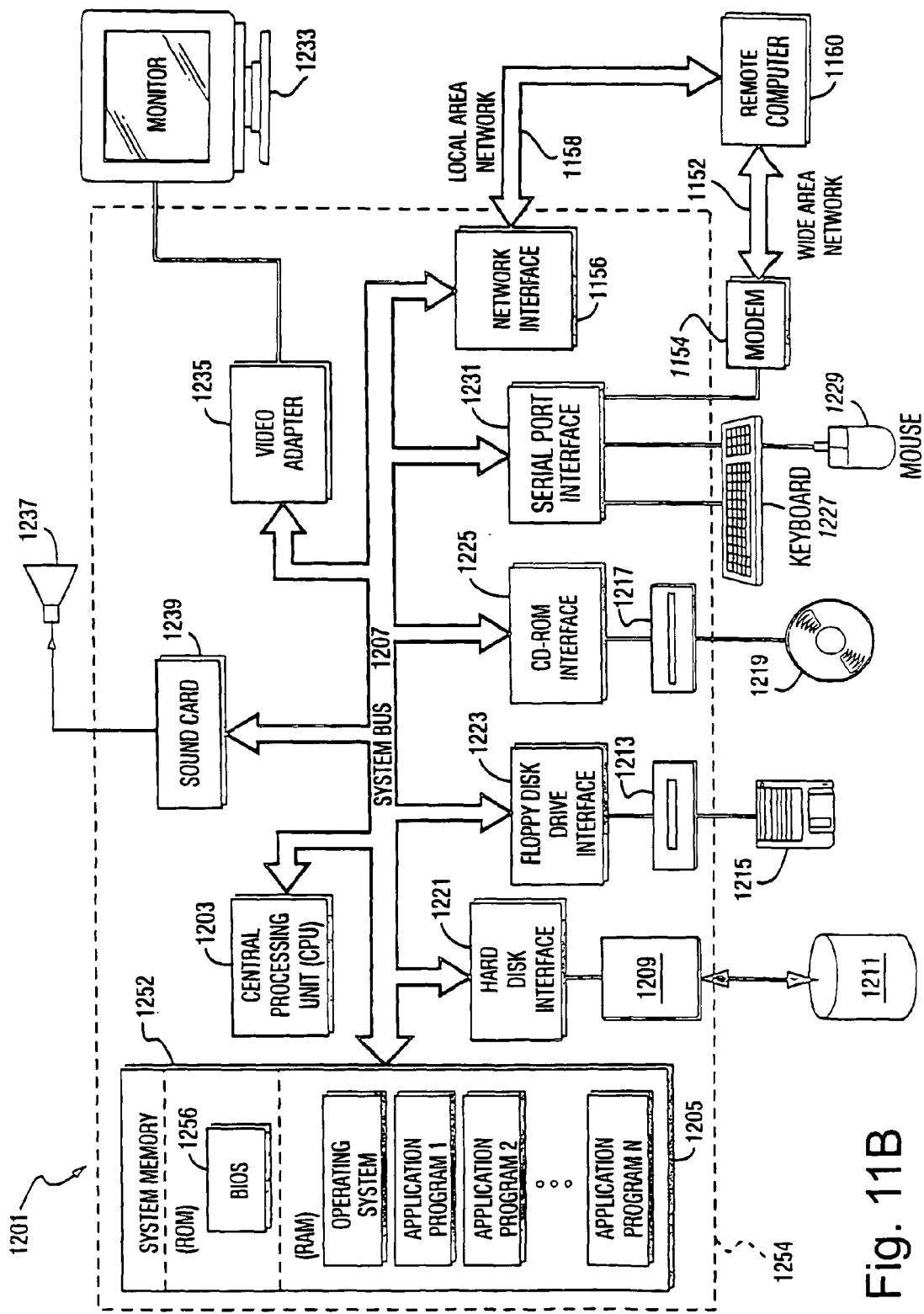

FIG. 11B illustrates one example emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209, magnetic disk drive 1213, and optical disk drive 1217 are connected to system bus 1207 by a hard disk drive interface 1221, a magnetic disk drive interface 1223, and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port, Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 1305.

Figure 11C:
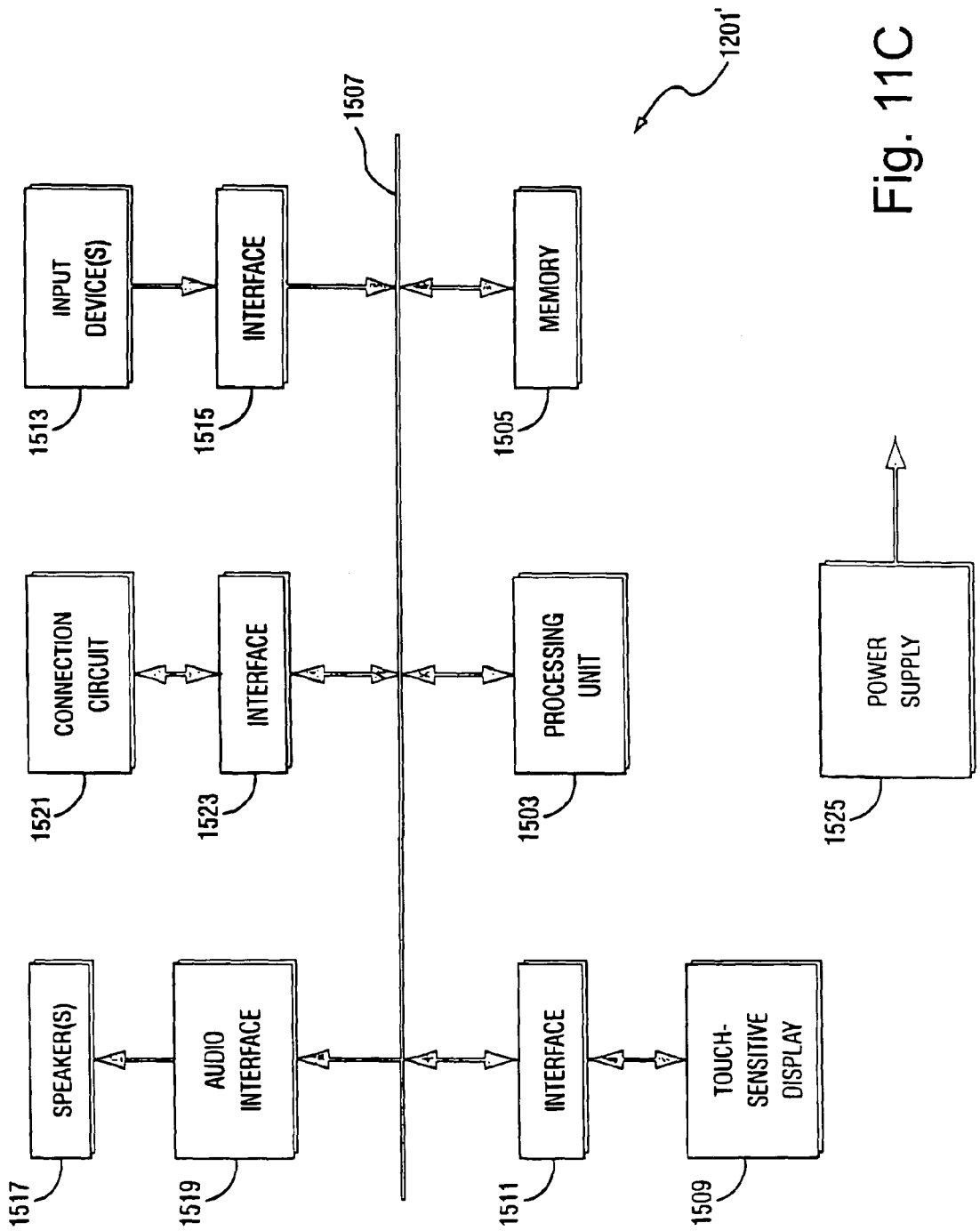

FIG. 11C illustrates another example emulation host system 1201' suitable for use with emulator 1303. The emulation host system in FIG. 30C is generally configured along the lines of a personal digital assistant such as those available from palmOne Inc., Hewlett-Packard, Handspring, Dell, Sony and others and running an operating system such as Windows CE, EPOC, PalmOS, Microsoft Mobile PocketPC, or Windows Mobile. Typically, such personal digital assistants provide capabilities for a diary/scheduler, to-do lists, phone/address books and the like. System 1201' includes a processing unit 1503 and memory 1505. A system bus 1507 couples various system components including memory 1505 to processing unit 1503. Memory 1505 includes read only memory (ROM) and random access memory (RAM). Memory 1505 may also include external memory in the form of memory cards or memory sticks inserted into a suitable port provided in the housing for the components of system 1201'. A touch-sensitive display screen (e.g., a touch-sensitive liquid crystal display screen) 1509 is also connected to system bus 1507 via an interface 1511. Inputs via touch-sensitive screen 1509 are typically made using a stylus. Other input devices 1513 such as pushbuttons, switches, pointing devices and the like are also connected to system bus 1507 via an interface 1515. The input devices may also include external keyboards or game control devices (e.g., joystick, game controller). The input devices may be used as game controls (e.g., starting the game, character movement, character action, etc.) when system 1201' is used with emulator 1303.

Games may be written to memory 1505 using communication circuit 1521 which may take the form of a modem for downloading the game from the Internet, for example, or of a cradle (e.g., a USB cradle) for connecting system 1201' to a personal computer.

One or more speakers 1517 are connected to system bus 1507 via an audio interface 1519 to output sounds. A communication circuit 1521 is connected to system bus 1507 via a communications interface 1523 to permit communication with other devices. By way of illustration, communication circuit 1521 may, for example, be a modem and communications interface 1523 may be a serial port. Generally speaking, communication circuit 1521 may be configured for wired or wireless communication in accordance with any conventional communication protocol. A power supply 1525 provides power for the components of system 1201'.

The contents of any technical documents or patent documents referenced above are incorporated herein in their entirety.

As one embodiment of the present invention, the portable game machine having a hardware structure as shown in FIGS. 10 and 11 has been described. However, the present invention is applied not only to the portable game machine having such a hardware structure, but to the one having the above hardware structure achieved by the CPU and software. Also, the portable game machine according to the present embodiment can be emulated by a computer system, such as a personal computer or a portable information terminal. In this case, a game program that causes the computer system to achieve each hardware function of the portable game machine according to the present embodiment is supplied to the computer system. With this, the present invention can be applied also to a general-purpose computer system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A memory card adapted for at least partial insertion into a memory card slot of a hand-holdable video game system, said memory card including first and second memories and a connector for electrically connecting the memories to the video game system so that contents of the memories are selectively accessible to a processor of the video game system, the connector comprising a plurality of linearly-arrayed terminal strips that connect to corresponding electrical contacts of the video game system disposed within the memory card slot, the terminal strips including:

a first terminal strip for, in use, connecting to a first ground terminal of the video game system;

a second terminal strip for, in use, connecting to a clock terminal of the video game system;

a third terminal strip for, in use, connecting to a first high voltage terminal of the video game system;

a fourth terminal strip for, in use, connecting to a first chip select terminal of the video game system;

a fifth terminal strip for, in use, connecting to a reset terminal of the video game system;

a sixth terminal strip for, in use, connecting to a second chip select terminal of the video game system;

a seventh terminal strip for, in use, connecting to an interrupt terminal of the video game system;

an eighth strip terminal for, in use, connecting to a second high voltage terminal of the video game system;

ninth through sixteenth terminal strips for, in use, connecting to a bus of the video game system; and a seventeenth terminal strip for, in use, connecting to a second ground terminal of the video game system, wherein the first memory of the memory card is accessed in a parallel bus mode via the ninth through sixteenth terminal strips when a chip select signal having a specified level is applied to the fourth terminal strip via the first chip select terminal, and wherein the second memory of the memory card is accessed in a serial peripheral interface mode in which first and second ones of the ninth through sixteenth terminal strip are respectively used as a serial input terminal and a serial output terminal when a chip select signal having a specified level is applied to the sixth terminal strip via the second chip selection terminal.

2. The memory card according to claim 1, wherein the memory card is substantially square-shaped.

3. The memory card according to claim 1, wherein the first memory device comprises a read-only memory storing a video game program.

4. The memory card according to claim 1, wherein the second memory comprises an EEPROM.

5. The memory card according to claim 1, wherein the linearly-arrayed terminal strips are disposed in a recess provided in a surface of the memory card.

6. The memory card according to claim 1, further comprising:

ribs arranged between adjacent ones of the linearly-arrayed terminal strips.

* * * * *